United States Patent [19]

Novak

[11] Patent Number: 4,783,902

[45] Date of Patent: Nov. 15, 1988

[54] TOOL STORE FOR MACHINE TOOLS AND METHOD FOR THE OPERATION THEREOF

[75] Inventor: Peter Novak, Tägerwilen, Switzerland

[73] Assignee: Starrfrasmaschinen AG, Rorschacherberg, Switzerland

[21] Appl. No.: 115,770

[22] Filed: Oct. 30, 1987

[30] Foreign Application Priority Data

Nov. 3, 1986 [CH] Switzerland .................. 4344/86

[51] Int. Cl.⁴ ........................................... B23Q 3/157
[52] U.S. Cl. ........................................ 29/568; 211/1.5
[58] Field of Search ............... 29/568, 26 A; 211/1.5

[56] References Cited

U.S. PATENT DOCUMENTS 4,577,389  3/1986  Shultz .................................. 29/568

FOREIGN PATENT DOCUMENTS 2543467  10/1984  France .................................. 29/568
0090617   5/1985  Japan .................................... 29/568

Primary Examiner—William R. Briggs
Attorney, Agent, or Firm—Helfgott & Karas

[57] ABSTRACT

A rotor having an upper and a lower track is rotatably mounted on a column. Tool magazines equipped with running devices are mounted on the tracks. On a store frame is fixed a first gripper mechanism having second lifting units enabling a selected tool magazine to be blocked on the rotor and brought into the loading and unloading position. A second gripper mechanism is mounted on the rotor and is used for seeking a selected tool magazine, for securing it to the rotor and bringing to the first gripper mechanism. By forming a magazine free section on the rotor, a display arm and a loading and unloading station can be used to remove tools from the store and return them again. By using a further display arm, tools can be changed manually or by means of a portal loader during the machining time. As only one magazine-free section is required for loading and unloading, the store can have a much a higher store capacity than known stores.

11 Claims, 5 Drawing Sheets

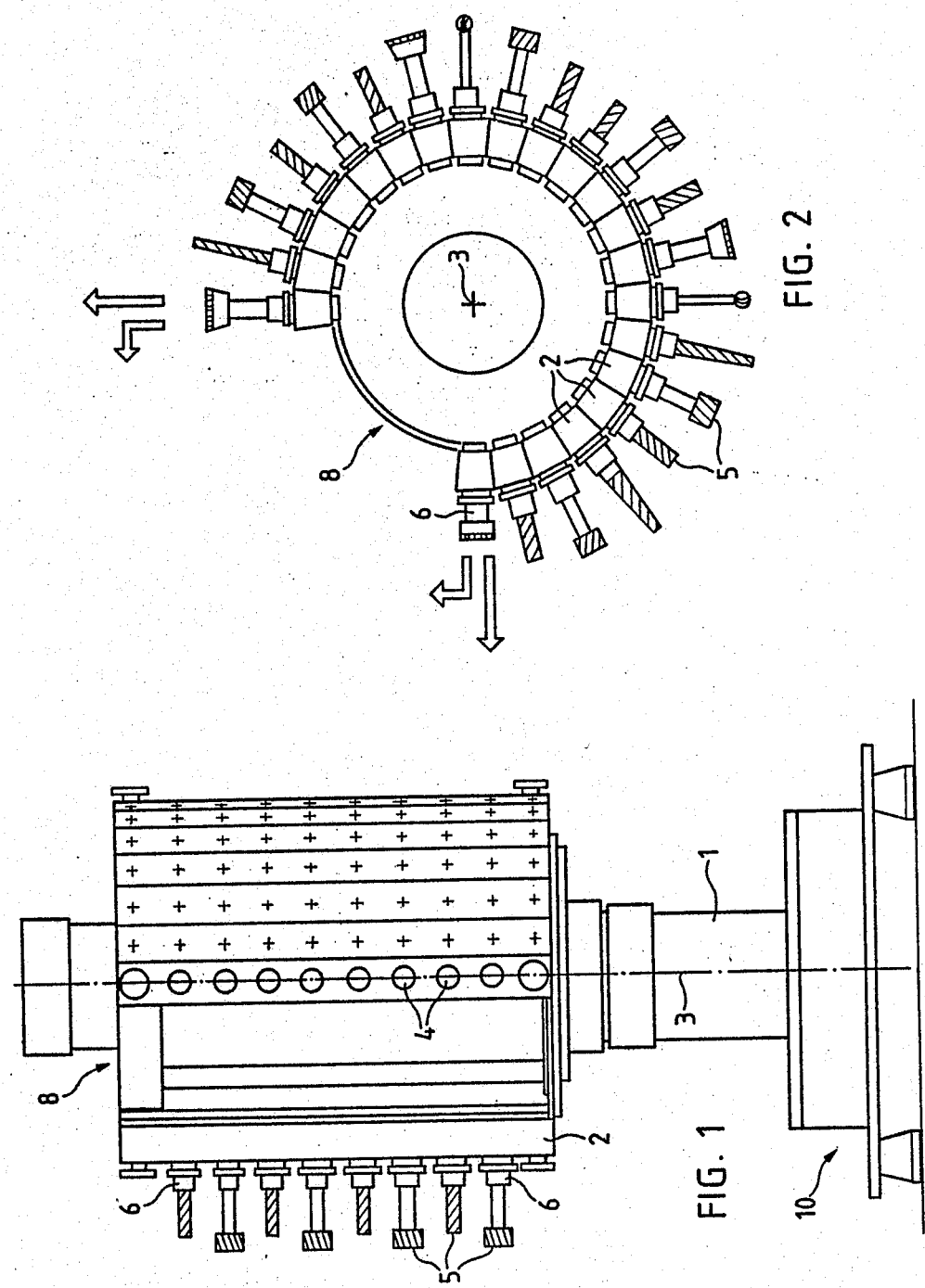

TOOL STORE FOR MACHINE TOOLS AND METHOD FOR THE OPERATION THEREOF

CROSS REFERENCE TO COPENDING APPLICATION

This application is related to copending application Ser. No. 115,761, filed on even date herewith and entitled Storage and Transportation Unit for Receiving Machining Tools for Machine Tools.

BACKGROUND OF THE INVENTION

The invention relates to a tool store for machine tools, particularly numerically controlled processing or machining machines wherein tools can be stored and arranged on a tool magazine and wherein tools can be removed and returned by means of a handling device. The invention also relates to a method for operating this tool store.

Tool stores are mainly used in machine tools for the numerically controlled machining of workpieces, particularly in machining centres. One known basic configuration of the tool store is the disk-like plate magazine, on whose circumference the tools, usually together with a tool holder, are arranged cylindrically or radially. When the tools are arranged radially, an increase in the number of the storage places can be obained by superimposing several such plate magazines in layer form, cf. e.g. German Pat. No. 1 912 369. In such a tool store, the tools are stored in axially displaceable blocks, with the aid of which the tools can be moved into a tool transfer position, where they can be removed from the magazine or returned to the same by the tool changer. However, this configuration has the disadvantage that a relatively large expenditure is involved in connection with the displaceable storage of the blocks and the displacement mechanism.

This disadvantage can be reduced by arranging the tools in several stages axially on a rotating drum and locating the tools with their longitudinal axis tangential to a circular path concentric to the cylinder, so that they can be removed and inserted by a gripper means. However, in this arrangement the number of tools arranged on the drum circumference is relatively small (Swiss Pat. No. 556, 712).

A second basic form of a tool store is the chain magazine, in which the tools are placed in parallel or at right angles to the rotation axes of a rotating chain drive. However, if the number of tool places of such a chain magazine is not sufficient, it necessary to set up one or more additional magazines on the machine tool. This arrangement requires a relatively large amount of space, as well as a relatively large expense for removing and returning the tools.

In addition, so-called surface stores are known in which the tools are arranged on a planar, usually vertical surface and are removed and returned by a gantry or portal loader. This arrangement can be used to have a large tool storage capacity and in addition each tool can be relatively rapidly reached by means of the portal loader, without moving the entire mass of tools, such as is the case with the plate or chain magazine. However, the large amount of space required is very disadvantages, because apart from its own surface area, each tool requires additional, unused access surfaces for the portal loader, so that the latter has to perform large displacements. This solution is also scarcely usable for multi-spindle machines, because the simultaneous removal of several tools from the surface store is problematical.

SUMMARY OF THE INVENTION

Is is an object of the invention to provide a tool store wherein a relatively large number of tools can be reached on a small surface area. Another object is to provide a new and improved tool store characterized by rapid tool display and access and wherein a relatively large number of tools can be reached on a small service area.

In accordance with the principles of the invention, a tool store for machine tools includes a stationary vertical column and a vertical hollow cylindrical rotor having first and second opposite ends and an outer surface. The rotor is disposed rotatably about the column, the column and rotor having a common vertical axis.

First and second horizontal circular tracks are centered on the axis and secured to the outer surface of the rotor adjacent corresponding first and second rotor ends. A plurality of vertically elongated tool carrying magazines are disposed circumferentially about the outer surface of the rotor. Each magazines has first and second running means which respectively engage the first and second tracts to enable each magazine to be movable circumferentially about the rotor. The magazine movement is controlled in such manner that, when the magazines are stationary, a horizontal circular arc section around the rotor is formed which is magazine free. The magazines are displaceable relative to the rotor in the circumferential direction, abut against one anther and receive tools. The magazine-free sector is formed for the loading and unloading of the rotor with tool magazines and for the access of the handling device to the tools. Thus, the tool locations can be very closely juxtaposed, but in the magazine-free sector there is sufficient space for the access of a handling device for removing a selected tool from a selected magazine.

A stationary frame is disposed radially from and surrounding the cylinder. First gripper means is secured to the frame at a removal station coincident with one end of the magazine free sector. Second gripper means is secured to the rotor for seeking a selected one of the magazines, securing the selected magazine and moving the selected magazine to the first gripper means.

In operation, in order to remove a selected tool from a selected one of the tool magazines, the tool magazines are initially blocked at the removal station by actuating the first gripper means. The second gripper means is moved by the rotor to the selected tool magazine. The second gripper means is caused to connect the said one magazine to the rotor. The tool magazines are unblocked at the coincident position by deactuating the first gripper means. The rotor is rotated until the said one magazine is positioned at the coincident position. The first gripper means is then actuated to cause the first gripper means to be secured to the selected magazine. The selected magazine can then be removed from the rotor and positioned in such manner that the selected tool can be removed.

The foregoing as well as additional objects and advantages of the invention will either be explained or will become apparent to those skilled in the art when this specification is read in conjunction with the brief description of the drawings and the detailed description of preferred embodiments which follow.

BRIEF DESCRIPTION OF THE DRAWINGS

FIG. 1 is a diagrammatic side view of a tool store.

FIG. 2 is a diagrammatic plan view of the tool store of FIG. 1

DETAILED DESCRIPTION OF THE PREFERRED EMBODIMENTS

Figure 3:
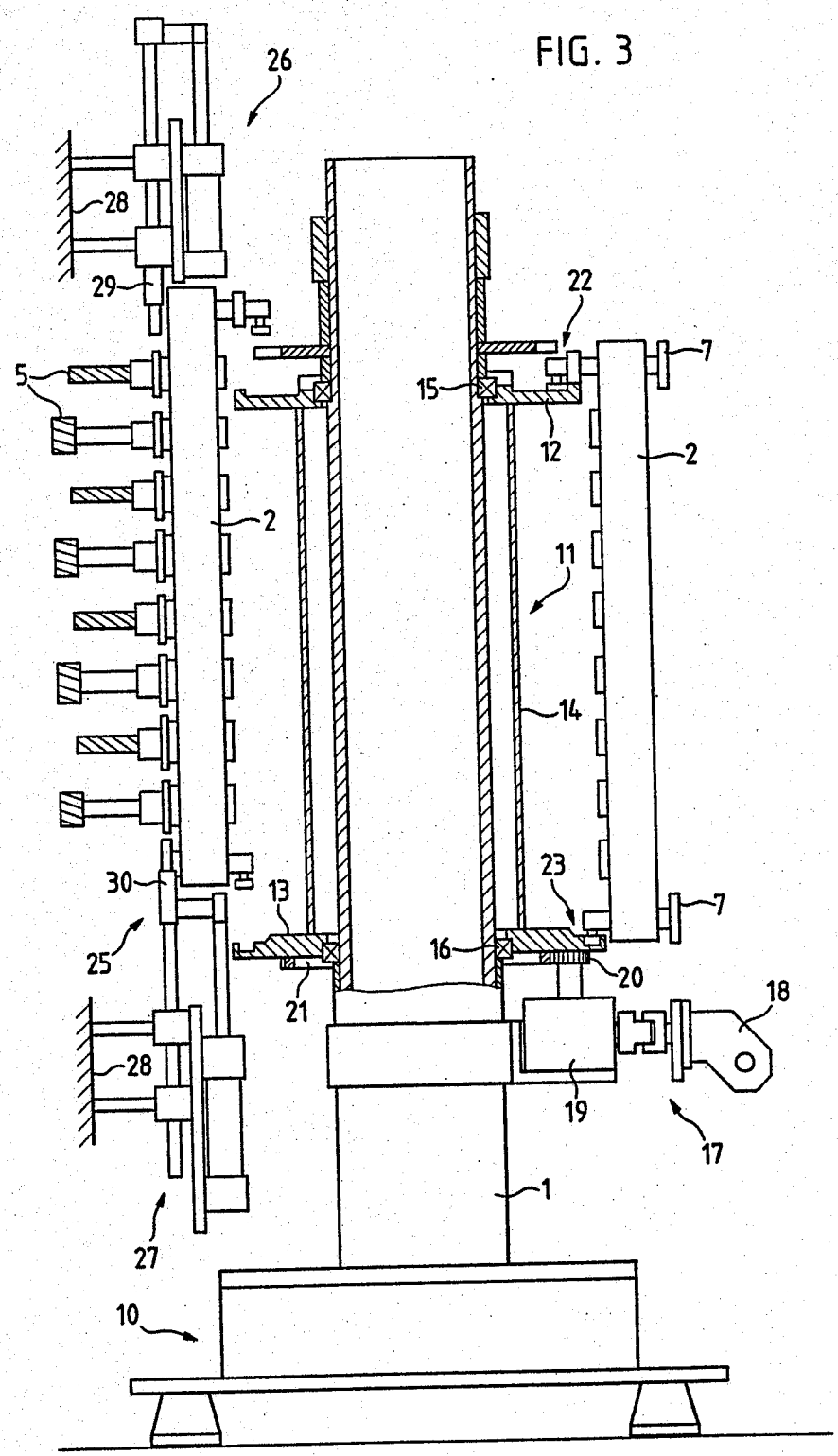
FIG. 3 is a longitudinal section of the tool store according to FIG. 1 with a tool magazine, which is held by a first gripper means in the loading and unloading position.

As shown in FIG. 1, a tool store has a cylindrical column 1, whereby a plurality of juxtaposed tool magazines 2 are annularly arranged around the column axis 3. The tool magazines 2 extend axially parallel to the column axis 3 and have a plurality of juxtaposed tool places or locations 4, in which the tools 5 with tool holders 6 are radially stored, as described in more detail in connection with FIG. 6. At the ends of the tool magazines 2 are provided gripper plates 7, which can also be used for coding purposes.

As shown in FIG. 2, only a sufficient number of tool magazines 2 are annularly juxtaposed to ensure that a magazine-free section 8 is formed, which can have an angle of approximately 60° to 90°.

Column 1 has a foundation 10, which can be constructed as a leg or a structure integrated into the tool machine bed. The column 1 can be positively connected to foundation 10, e.g. by welding or pinning, or non-positively by clamping. In the latter case a stepless, radial setting of the entire tool store can be used in accordance with peripheral circumstances.

As shown in FIG. 3 the column 1 carries a cylindrical rotor 11, which comprises an upper and a lower annular track 12, 13 and a coaxial roller 14 connecting said track 12, 13 and which is rotatably mounted on column 1 by means of bearings 15, 16.

Rotor 11 is rotated by a motor drive 17, e.g. a hydraulic motor 18 and a reduction gear 19, a driving pinion 20 meshing with a gear fixed to the lower track 13 and positioned coaxially to column axis 3. Drive 17 can rotate the rotor clockwise and counterclockwise in steps or in a stepless manner.

The tool magazines 2, each carrying a plurality of tools 5, which are fixed in a clearly defined position within the magazine, are rotably supported on tracks 12, 13 with two running means 22, 23, which essentially comprise support rollers and runners and permit a relative movement on rotor 11. The tool magazines 2 are arranged in circumferentially suspended manner on the tracks 12, 13 of rotor 11.

FIG. 3 also shows a first gripper means 25, which essentially comprises two facing lifting units 26, 27, e.g. pneumatic or hydraulic cylinders arranged in the longitudinal direction of the magazine and fixably supported on a frame 28 of the tool store. Lifting units 26, 27 are provided at the end with a gripper 29, 30 enabling the in each case displayed tool magazine 2 to be gripped, centered and displayed to a tool changer in an appropriate height. Several lifting positions can be realized with lifting units 26, 27.

Figure 4:
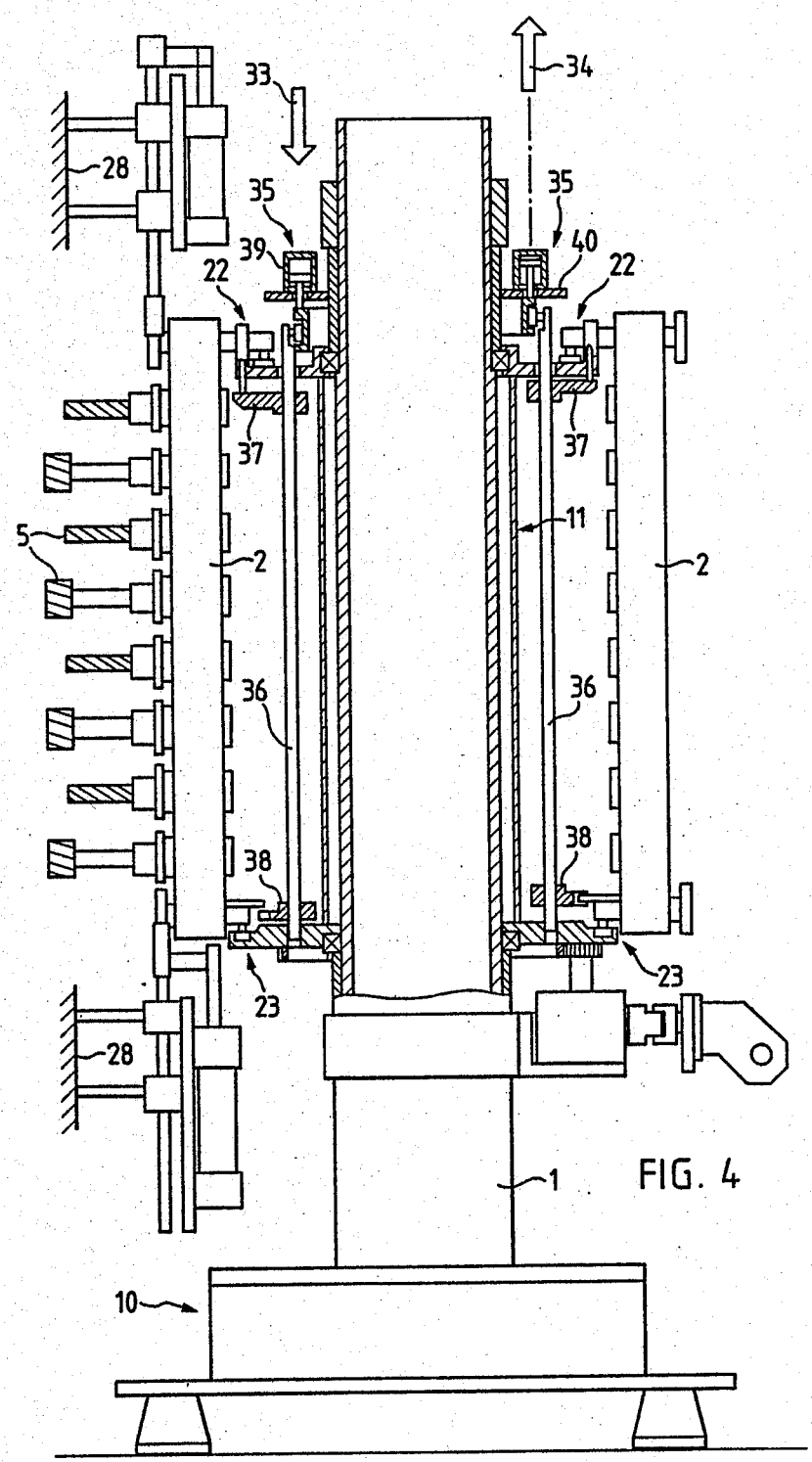
FIG. 4 is a diagrammatically represented longitudinal section of the tool store according to FIG. 1, in which the function of the second gripper means for fixing a tool magazine to a rotor is shown.
Figure 5:
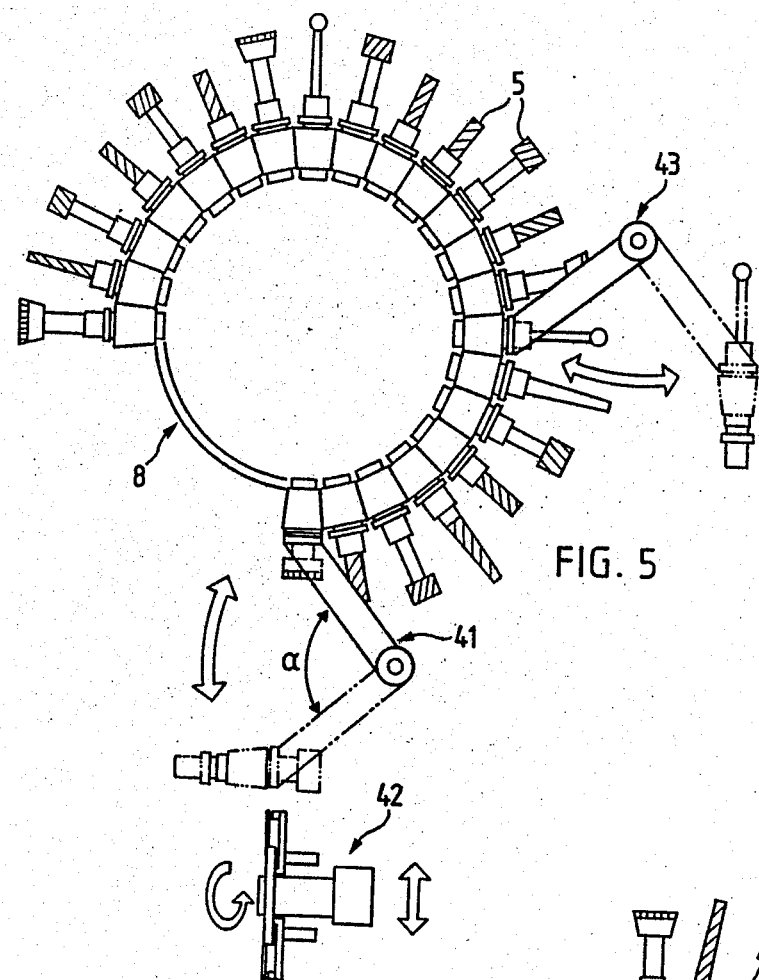
FIG. 5 illustrates several access devices on the tool store.

Whereas the first gripper means 25 is fixed in immovable manner to the frame 28 of the tool store, FIG. 4 shows a second gripper means 35, which is mounted on rotor 11 and with which a particular tool magazine 2 is sought and can be fixed to rotor 11. FIG. 4 shows gripper means 35, represented in two different positions, cf. the two arrows 33, 34. The second gripper means 35 comprises a carrier rod 36, as well as an upper and a lower gripper fork 37, 38 and is raised by a lifting mechanism 39, which is positioned on a control ring 40 mounted on rotor 11, cf. arrow 34. In this position of the second gripper means 35, the gripper forks 37, 38 fix the running means 22, 23 of the selected tool magazine 2, so that it rotates therewith during the rotation of rotor 11.

As shown in FIG. 4, the circular construction of the tool store and the randomly positionable magazine-free section 8 make it possible to choose the tool action over the entire store circumference. As it is advantageous to display the tools close to the work spindles, so that there are only short paths for the actual tool change, the tool access can be obtained with respect to a loading and unloading station 42 with a display arm 41. It is also possible to eliminate the use of the display arm 41 and to carry out the tool change directly with the loading and unloading station 42. A further display arm 43 serves to manually carry out the changing of an individual tool during an idle time. The actual function of the tool store is nevertheless ensured and the machine tool can maintain its production. In order that the loading and unloading process can be performed, the first gripper means 25 is located at the transfer point with the loading and unloading station 42.

The described tool store has a high storage capacity. If e.g. ten tools are used per tool magazine and if on the circumference there are 22 tool magazines 2 for ISO cone 45, there is a maximum storage capacity of 220 tools. However, it is not necessary to use up this full storage capacity and instead only the particular number of tools required can be provided. This in no way influences the function of the store. In fact, it leads to smaller masses to be moved and accelerated.

Figure 6:
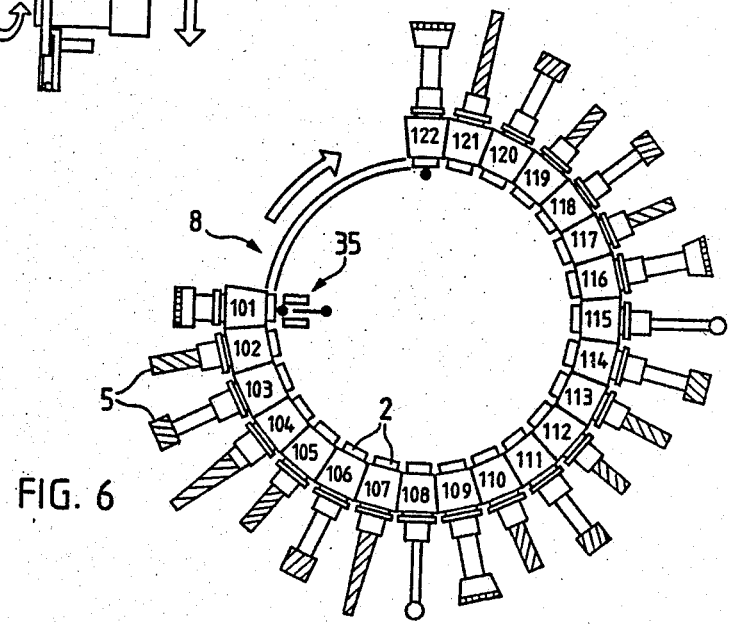
FIG. 6 is a diagrammatically represented plan view illustrating operation of the tool store according to FIG. 1.

The operating cycle of the tool store will now be described relative to FIG. 6. In the starting position the rotor 11 is charged with tool magazines 2 by the loading and unloading station 42. They carry an identification code which is read into the machine control system. Each cassette is continuously numbered. In the control system, the number has a cross reference to the identification code and therefore to the cassette content. The operating cycle is as follows.

(a) The first gripper means 25 (not shown) retains the tool magazine 101.

(b) The machine programme calls up the display of a tool magazine, e.g. number 115.

(c) The drive of the rotor with the second gripper means 35 receives a command impulse for clockwise rotation, cf. arrow.

(d) The tool magazine is secured from the outside and all the other tool magazines are stowed on it. As the rotor rotates, the running means move relative to the rotor, but without any movement of the tool magazines.

(e) The second gripper means 35 now moves with the rotor from magazine 101 to magazine 115 at the rapid-traverse rate.

(f) During the movement an indicator 50 counts the magazines and indicates same to the control system (here the difference from 112 to 115 is counted).

(g) At the penultimate magazine, in this case number 116, switching takes place from rapid-traverse to the positioning rate. On reaching magazine 115, the second gripper means 35 is precisely stopped and positioned.

(h) Magazine 115 is positively connected to the rotor by the second gripper means 35.

(i) The rotor is accelerated again after freeing magazine 101 by removing the first gripper means.

(j) all the magazines located upstream of magazine 116 in the rotation direction are now necessarily also accelerated, i.e. in this case magazines 101 up to and including 115.

(k) Magazines 116 to 122 are now accelerated by friction. This is advantageous because on average the rotary drive does not have to provide the entire starting peak moment. In the meantime the more strongly accelerated magazine 101 brings in magazine 122 and the magazine-free section is now formed between magazine 115 and 116.

(l) Magazine 115 approaches the transfer point with the first gripper means 25. The drive speed is reduced to the positioning speed. All magazines, apart from magazine 115 maintain their speed due to inertia or are only subject to delay through friction and, as for the starting position, automatically form at the desired point the magazine-free sector 8 for the tool handling device.

(m) When the transfer position is reached by the rotor and therefore by magazine 115, the lifting units 26, 27 of the first gripper means 25 are closed and they lift magazine 115 into the desired height. The handling device can now remove the tools from different positions of the magazine.

The operating cycle can now recommence as in (a).

Considerable significance is attributed to the rapid display and access possibility in a tool store. This is particularly important if there is a succession of operations with short machining time. In this case the tools cannot be made ready in the idle time. The display time is also added to the actual change time of the tool handling device, which once again reduces machine availability. This phenomenon is particularly disadvantageous in the case of tool stores with high to very high store capacities.

The described tool store makes use of a two dimensional storage arrangement, so that on displaying a magazine, all the tools thereof are simultaneously displayed.

Using as a basis the aforementioned example with ten tools per magazine, every 80 mm per travel path of the rotor ten new tools are displayed. In order to display all 220 tools, the described tool store requires one revolution, which corresponds to a path of approximately 2.5 m.

However however, the cycle time can also be optimized in the described tool store. This is achieved by the relative movement between the magazines and rotor 11. If a magazine is displayed in accordance with a programme call and is fixed by the first gripper means 25, the rotor immediately performs the search for the next called magazine, without impeding the tool handling device in the parallel-performed tool removal. This makes it possible to achieve very rapid magazine display periods, which also permit a fixed tool location association and reduces significantly the control expenditure.

With the loading and unloading station, the loading and unloading of the individual tools can be optimized manually or by a portal loader. So that during such a tool exchange from the tool store on the one hand the machine tool and on the other the operator or portal loader are not blocked, the loading and unloading station offers an appropriate possibility for swinging out the particular magazine. This is advantageously performed during a favourable operating sequence with the loading and unloading arm, which brings the magazine from the working area of the tool stool into a loading and unloading position. The tools can be changed by the operator or portal loader without impeding the main machine time and with its own working rhythm.

The machine control system can also fix the most favourable time for changing complete magazines, so that between operations individual magazines can be loaded and unloaded without influencing the main time.

It is not necessary for all the magazines to have the same width. If use is made of tools with a relatively large diameter, correspondingly wider magazines can be used.

Figure 7:
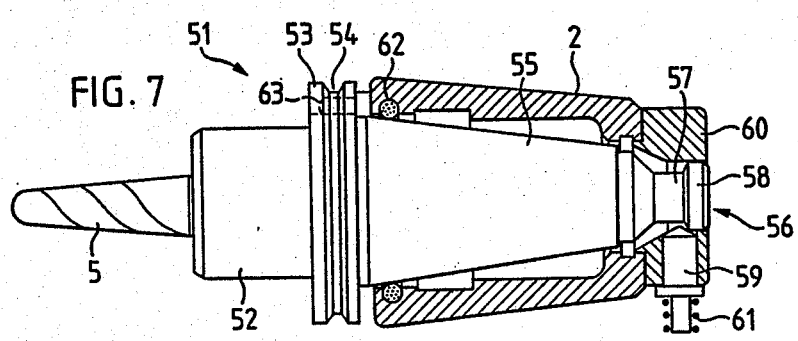
FIG. 7 is a section view through a tool magazine with a tool located therein.

FIG. 7 is a sectional view through a tool magazine 2 with a tool 5. The tool is held in a tool holder 51, which has a tool clamping device 52, a handling ring 53 with a gripping groove 54 and a tool cone 55. The latter has a retaining pin 56 with a neck 57, which is bounded by an end flange 58 and in which engages a locking bolt 58 guided in a retaining ring 60, together with a spring 61. The tool holder 51 is resiliently guided on the larger diameter of the cone 55 by an elastic O-ring 62 held in tool magazine 2 and is also positioned by a stop pin 62. Through this arrangement the tool holder 51 is positively secured in tool magazine 2 but, after overcoming the tension of the detent spring 61, can be grasped and removed at handling ring 53.

Figure 8:
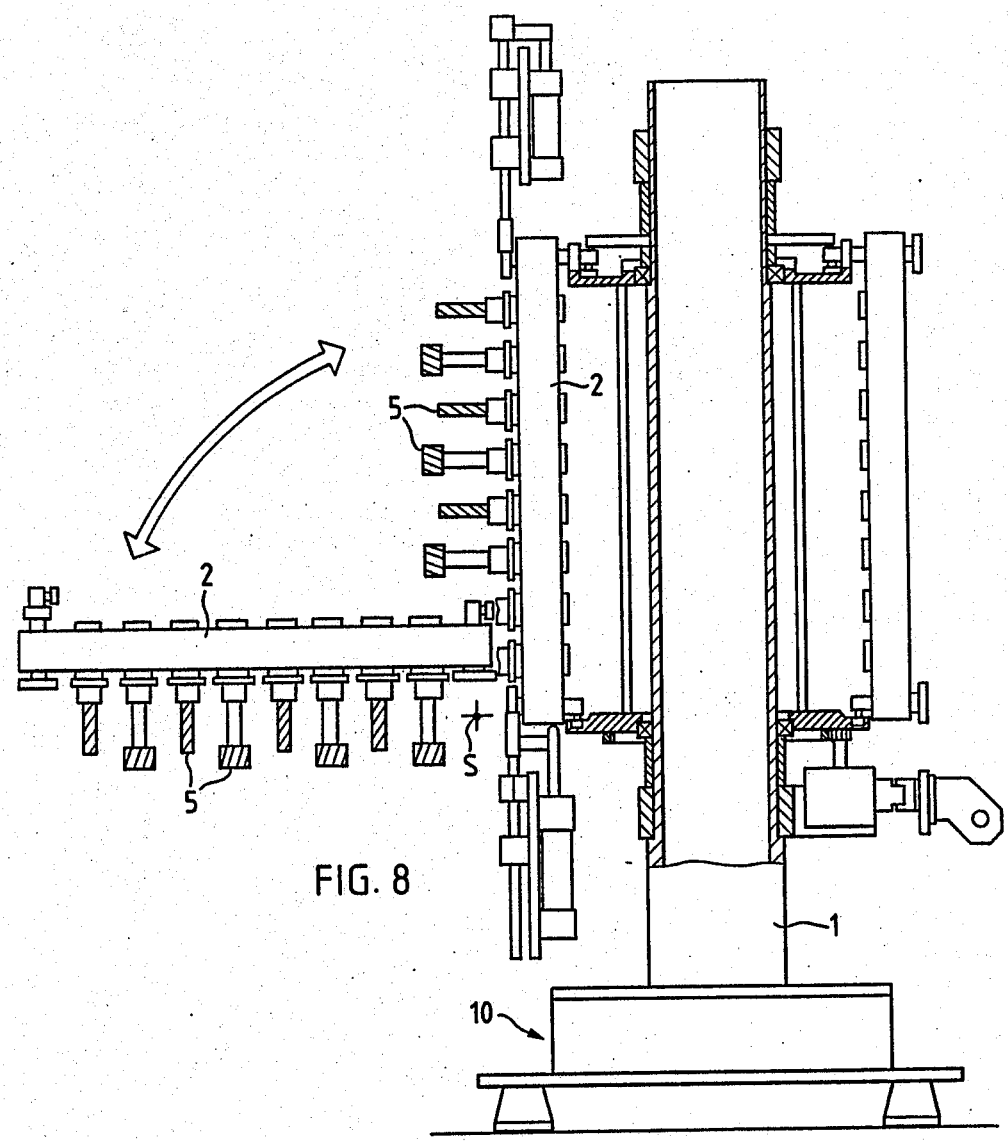
FIG. 8 shows the tool store according to FIG. 1 with the swung out tool magazine.

It has been assumed hereinbefore that the tool display is performed in the case of a vertical arrangement of magazines 2. If direct access with the tool changer is not possible, e.g. for sapce reasons, or it is more advantageous to display the tool in the vicinity of the work spindle of the machine tool, use is made of the display arm. If for certain machine tools the first gripper means 25 constructed on the store as a magazine lift display is not sufficient, the display arm can be correspondingly equipped, e.g. with a lifting or pivoting mechanism. According to FIG. 8, the pivoting mechanism makes it possible to pivot the tool magazine 2 about a pivot axis S. The pivoting of tool magazine 2 in a radial direction with respect to the store is generally necessary in the case of machine tools with vertical work spindles. However, it is also possible due to the magazine-free section on the tool store to position the pivot axis S radially to the tool store, so that the tool magazine 2 can be tangentially pivoted. The tool magazine 2 and the tool axes are then located horizontally. However, it is important that here again the standard construction of the tool store can be retained and no modifications are necessary.

While the invention has been described with detailed reference to the drawings, it will be obvious to those skilled in the art that many modifications and changes can be made within the scope and sphere of the invention as defined in the claims which follow.

What is claimed is:

1. A tool store for machine tools comprising:
a stationary vertical column;

a vertical hollow cylindrical rotor having first and second opposite ends and an outer surface, the rotor being disposed rotatably about the column, the column and rotor having a common vertical axis;

first and second horizontal circular tracks centered on the axis and secured to the outer surface of the rotor adjacent corresponding first and second rotor ends;

a plurality of vertically elongated tool carrying magazines disposed circumferentially about the outer surface of the rotor, each magazine having first and second running means which respectively engage the first and second tracks to enable each magazine to be movable circumferentially about the rotor, the magazine movement being controlled in such manner that when all magazines are stationary, one horizontal circular arc section extending around the rotor is magazine free; and a stationary frame disposed radially from and surrounding the cylinder.

2. The store of claim 1 further including first gripper means secured to the frame at a removal station coincident with an end of the magazine free section and second gripper means secured to the rotor for seeking a selected one of the magazines, securing the selected magazine and moving the selected magazine to the first gripper means.

3. The store of claim 2 wherein each magazine has two opposite ends, each end having a gripper plate and wherein the first gripper means is provided with first and second lifting units, each unit having grippers, the first and second units being disposed adjacent corresponding first and second ends of the rotor so that the grippers can grasp corresponding plates of any magazine positioned at said removal station to enable the said any magazine to be transferred into loading and unloading position.

4. The store of claim 3 wherein the second gripper means is mounted on the rotor and includes a carrier rod and upper and lower gripper forks, the store further including a lifting mechanism connected to the rotor for raising the second gripper means into a position for securing a tool magazine to the rotor.

5. The store of claim 4 wherein each tool magazine is provided with a plurality of removable and replaceable tools disposed side by side along a vertical row.

6. The store of claim 5 wherein the magazines can have different horizontal widths.

7. A method for removing a selected tool from a selected tool carrying mechanism in a tool store for machine tools, the store including a stationary vertical column, a vertical hollow cylindrical rotor having first and second opposite ends and an outer surface, the rotor being disposed rotably about the column, the column and rotor having a common vertical axis, first and second horizontal circular tracks centered on the axis and secured to the outer surface of the rotor adjacent corresponding first and second rotor ends, a plurality of vertically elongated tool carrying magazines, including the mechanism to be selected, disposed circumferentially about the outer surface of the rotor, each magazine having first and second running means which respectively engage the first and second tracks to enable each magazine to be movable circumferentially about the rotor, the magazine movement being controlled in such manner that when the magazines are stationary a horizontal circular arc section around the rotor is magazine free, a stationary frame disposed radially from and surrounding the cylinder, first gripper means secured to the frame at a removal station at one end of the magazine free section, and second gripper means secured to the rotor for seeking said selected one of the magazines, securing the selected magazine and moving the selected magazine to the first gripper means, the method including the steps of initially blocking the tool magazines at the removal station by actuating the first gripper means;

moving the second gripper means by the rotor to the selected tool magazine carrying the selected tool;

causing the second gripper means to connect the selected magazine to the rotor;

unblocking the tool magazines at the coincident position by deactuating the first gripper means;

rotating the rotor until the selected magazine is positioned at the coincident position; and actuating the first gripper means to cause the first gripper means to be secured to the selected magazine.

8. The method of claim 7 wherein the magazine free section exists only when the magazines are stationary and does not exist when the magazines are in movement.

9. The method of claim 7 wherein the one magazine is pivoted into horizontal position with respect to the rotor.

10. The store of claim 6 further including means to rotate the rotor in clockwise and in counterclockwise directions.

11. The store of claim 10 wherein the rotor rotation means can be regulated to rotate the rotor in discrete steps, each step being less than one revolution.

* * * * *